United States Patent
Zhang

(10) Patent No.: US 9,134,106 B2
(45) Date of Patent: Sep. 15, 2015

(54) TESTING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Bing-Jun Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 98 days.

(21) Appl. No.: 14/093,530

(22) Filed: Dec. 2, 2013

(65) Prior Publication Data

US 2014/0290082 A1   Oct. 2, 2014

(30) Foreign Application Priority Data

Mar. 29, 2013 (CN) .......................... 2013 1 0107125

(51) Int. Cl.
*G01B 5/25* (2006.01)
*G01B 5/20* (2006.01)

(52) U.S. Cl.
CPC ... *G01B 5/25* (2013.01); *G01B 5/20* (2013.01)

(58) Field of Classification Search
CPC .............. G01B 5/20; G01B 5/25; G01B 5/00; G01B 3/00
USPC ........................................... 33/550, 543, 613
See application file for complete search history.

(56) References Cited

U.S. PATENT DOCUMENTS

| | | | | |
|---|---|---|---|---|
| 7,458,168 B2* | 12/2008 | Furukawa | ........................ | 33/543 |
| 8,949,071 B2* | 2/2015 | Takanashi | ........................ | 33/550 |
| 2002/0178598 A1* | 12/2002 | Berger | ........................ | 33/506 |
| 2012/0266474 A1* | 10/2012 | Zhang | ........................ | 33/550 |
| 2013/0219731 A1* | 8/2013 | Zhang | ........................ | 33/550 |
| 2013/0298414 A1* | 11/2013 | Zhang | ........................ | 33/502 |
| 2014/0041243 A1* | 2/2014 | Zhang | ........................ | 33/533 |
| 2014/0290082 A1* | 10/2014 | Zhang | ........................ | 33/550 |
| 2014/0310971 A1* | 10/2014 | Zhang | ........................ | 33/811 |

FOREIGN PATENT DOCUMENTS

TW   201100749 A1   1/2011

* cited by examiner

*Primary Examiner* — Yaritza Guadalupe-Mccall
(74) *Attorney, Agent, or Firm* — Novak Druce Connolly Bove + Quigg LLP

(57) ABSTRACT

A testing device includes a position assembly, a benchmark assembly, and a measuring assembly. The position assembly includes a fixing base and a position member movably mounted on the fixing base. The benchmark assembly includes a mounting base oppositely configured to the fixing base, and a benchmark member rotatably positioned on the mounting base. The measuring assembly is positioned on the mounting base. The benchmark member includes a rotating portion and a locating portion coaxially connected with the rotating portion, the rotating portion is movably received in the mounting base, the locating portion protrudes from the mounting base and facing the position member. The measuring assembly includes a loading member movably positioned on the mounting base and a gauge mounted on the loading member.

18 Claims, 7 Drawing Sheets

TESTING DEVICE

BACKGROUND

1. Technical Field

The present disclosure generally relates to testing devices, and particularly to a testing device for testing a coaxial tolerance of an article having at least one columnar portion.

2. Description of the Related Art

In device machining, a number of through holes is often defined in the devices, and a number of columns or posts protrude from the devices. In many cases, to ensure that a coaxial tolerance between opposite through holes or opposite columns/posts meets specification requirement, a three-dimensional measuring device is employed for measuring a coaxial tolerance. However, using the three-dimensional measuring device is time-consuming.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
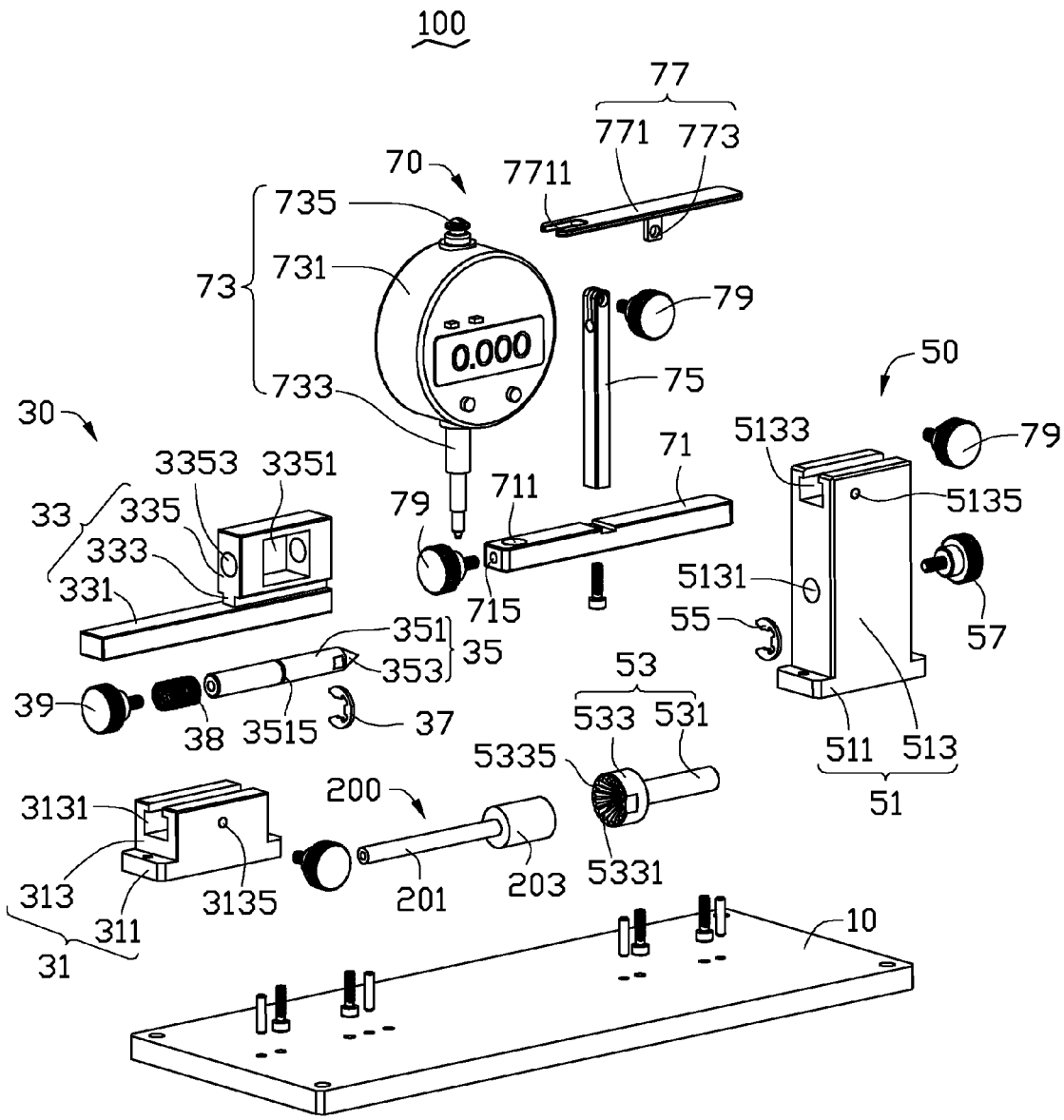
FIG. 1 shows an exploded view of a first embodiment of a testing device.
Figure 2:
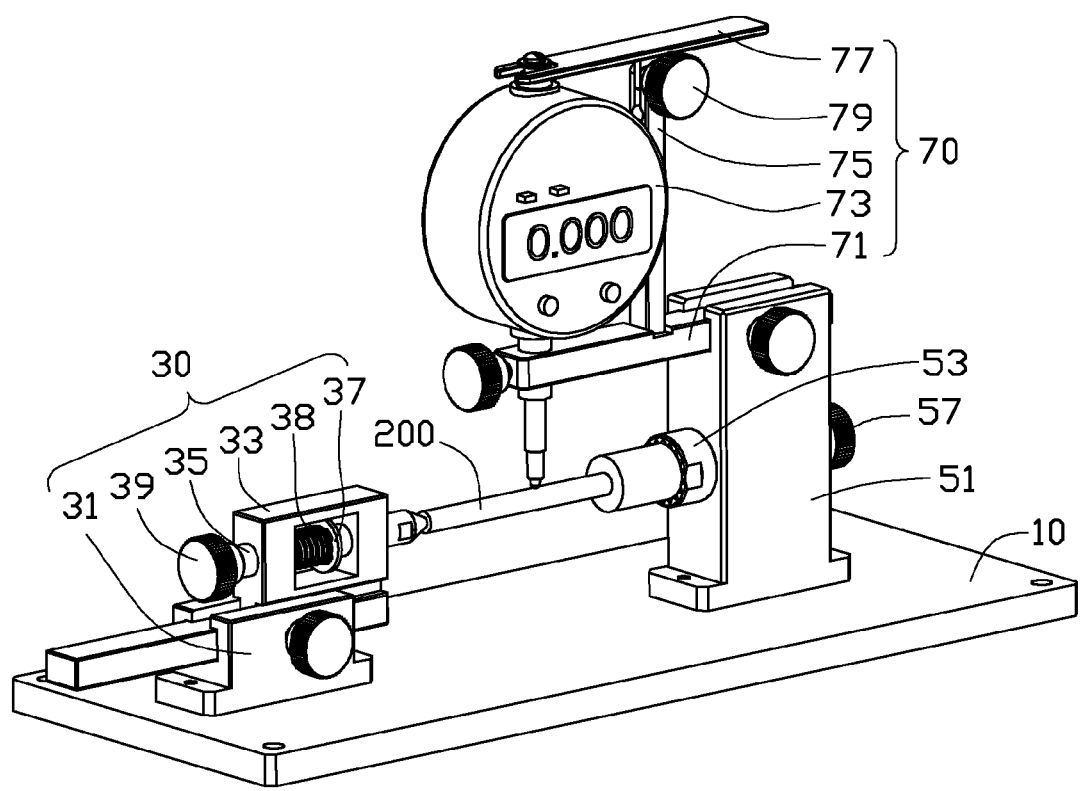
FIG. 2 shows an assembled, isometric view of the testing device of FIG. 1.

FIGS. 1 and 2 show a first embodiment of a testing device 100 for testing whether an axis of a first portion 201 of an article 200, an axis of a second portion 203 of the article 200 are coaxial with an axis of the article 200. The article 200 can be a component piece belonging as part of a PC chassis housing. A diameter of the first portion 201 is less than a diameter of the second portion 203. The testing device 100 includes a base 10, a position assembly 30, a benchmark assembly 50, and a measuring assembly 70. The position assembly 30 and the benchmark assembly 50 are located oppositely on the base 10. In this embodiment, the article 200 is located between the position assembly 30 and the benchmark assembly 50.

The position assembly 30 includes a fixing base 31, a slider 33, a position member 35, a clip member 37, and an elastic member 38. The slider 33 is slidably connected to the fixing base 31. The position member 35 is adjustably-assembled to the slider 33. The clip member 37 is engaged with the position member 35 and received in the slider 33. The elastic member 38 is sleeved around the position member 35.

The fixing base 31 includes a fixing portion 311 and a guiding portion 313 protruding from a first side of the fixing portion 311. A second side of the fixing portion 311 is fixed on the base 10. A guide groove 3131 is defined in the guiding portion 313. A fastening hole 3135 is defined in a substantially middle portion of a sidewall of the guide groove 3131. The slider 33 is slidably received in the guide groove 3131. The slider 33 includes a sliding portion 331, a connection portion 333, and an installation portion 335. The sliding portion 331 is substantially strip-shaped. The sliding portion 331 is slidably received in the guide groove 3131. The connection portion 333 is connected between the sliding portion 331 and the installation portion 335 and also received in the guide groove 3131. The installation portion 335 is connected to the connection portion 333 away from the sliding portion 331. A receiving hole 3351 is defined in a substantially middle portion of the installation portion 335. Two penetrating holes 3353 are defined in opposite end surfaces of the installation portion 335. The penetrating holes 3353 communicate with the receiving hole 3351.

The position member 35 includes a fastening portion 351 and a resisting portion 353 extending from one end of the fastening portion 351. The fastening portion 351 is received through the penetrating holes 3353 and the receiving hole 3351. A substantially ring-shaped seizing groove 3515 is defined in a circumference of an external wall of the fastening portion 351. The resisting portion 353 is substantially cone-shaped and protrudes out of the installation portion 335 toward the benchmark assembly 50. A diameter of the resisting portion 353 gradually decreases from the fastening portion 351 toward the benchmark assembly 50. The clip member 37 is substantially C-shaped and received in the receiving hole 3351. The elastic member 38 is sleeved around the fastening portion 351 and received in the receiving hole 3351, such that the elastic member 38 resists between the clip member 37 and an end wall of the receiving hole 3351 away from the resisting portion 353.

The benchmark assembly 50 includes a mounting base 51 and a benchmark member 53 adjustably received in the mounting base 51. The mounting base 51 is mounted on the base 10. The mounting base 51 includes a holding portion 511 and a location portion 513 protruding from the holding portion 511. An inserting hole 5131 is defined in the location portion 513. A sliding groove 5133 is defined in an end of the location portion 513 away from the base 10. A fastening hole 5135 is defined in a sidewall of the sliding groove 5133.

The benchmark member 53 is received in the inserting hole 5131. The benchmark member 53 includes a rotating portion 531 and a locating portion 533 coaxially connected to the rotating portion 531. An axis of the benchmark member 53 is defined as a benchmark line. In this embodiment, the axis of the benchmark member 53 is coaxial with an axis of the position member 35. The rotating portion 531 is rotatably received in the inserting hole 5131. The locating portion 533 has a greater diameter than the rotating portion 531, and protrudes from the inserting hole 5131. A substantially funnel-shaped positioning hole 5331 is defined in an end surface of the locating portion 533 away from the rotating portion 531. A diameter of the positioning hole 5331 gradually decreases from the locating portion 533 toward the rotating portion 531. A plurality of substantially strip-shaped resisting grooves 5335 is defined around a sidewall of the positioning hole 5331 for increasing amount of friction exerted between the benchmark member 53 and the article 200.

The benchmark assembly 50 further includes a substantially C-shaped clip member 55 and an operation member 57. The clip member 55 is clipped on an end portion of the rotating portion 531 adjacent to the locating portion 533, such that the clip member 55 is located between the mounting base 51 and the locating portion 533. The operation member 57 is fastened to an end of the rotating portion 531 away from the locating portion 533 for conveniently rotating the benchmark member 53.

The measuring assembly 70 includes a loading member 71, a gauge 73, a first support member 75, a second support member 77, and a plurality of fasteners 79. The loading member 71 is slidably received in the sliding groove 5133. A through hole 711 is defined through a side surface of the loading member 71 adjacent to the fixing base 31. An adjusting hole 715 is defined in an end surface of the loading member 71. The adjusting hole 715 communicates with the through hole 711. The gauge 73 includes a gauge body 731, a measuring portion 733, and a clamp portion 735. The gauge body 731 is located above the loading member 71 for displaying testing data. The measuring portion 733 is connected to the gauge body 731 and adjustably received through the through hole 711, such that the clamp portion 735 is adjustably located above the gauge body 731. The first support member 75 is fixedly-connected to the loading member 71. The second support member 77 includes a main body 771 and a fixing slice 773 protruding from a substantially middle portion of the main body 771. Two clamping arms 7711 extend from one end of the main body 771. The clamp portion 735 is clamped between the two clamping arms 7711.

In this embodiment, three fasteners 79 are employed. A first fastener 79 fastens the fixing slice 773 of the second support member 77 to an end of the first support member 75 away from the loading member 71. A second fastener 79 is received through the fastening hole 5135 to resist against the loading member 71, thereby positioning the loading member 71 in the sliding groove 5133. A third fastener 79 is received through the adjusting hole 715 of the loading member 71 to resist against a sidewall of the measuring portion 733. The first support member 75 and the second support member 77 cooperatively form a substantially T-shaped support structure for stably supporting the gauge 73.

In assembly, the fixing base 31 is fixed to the base 10, and the slider 33 is received in the guide groove 3131. The resisting portion 353 is received through one of the penetrating holes 3353 and extends into the receiving hole 3351. The elastic member 38 is sleeved around the fastening portion 351, and the resisting portion 353 extends out of the other penetrating hole 3353. The clip member 37 is engagingly received in the seizing groove 3515. The elastic member 40 resists between the clip member 37 and an end wall of the installation portion 335 in the receiving hole 3351 away from the resisting portion 353. The mounting base 51 is fixed on the base 10. The benchmark member 53 is assembled to the mounting base 51. The clip member 55 is clipped on the rotating portion 531. The operation member 57 is fastened to the rotating portion 531. The loading member 71 is slidably received in the sliding groove 5133. The gauge 73 is installed on the loading member 71. The first support member 75 and the second support member 77 are assembled together. The first support member 75 is fixedly connected to the loading member 71, and the second support member 77 is clamped to the clamp portion 735.

Figure 3:
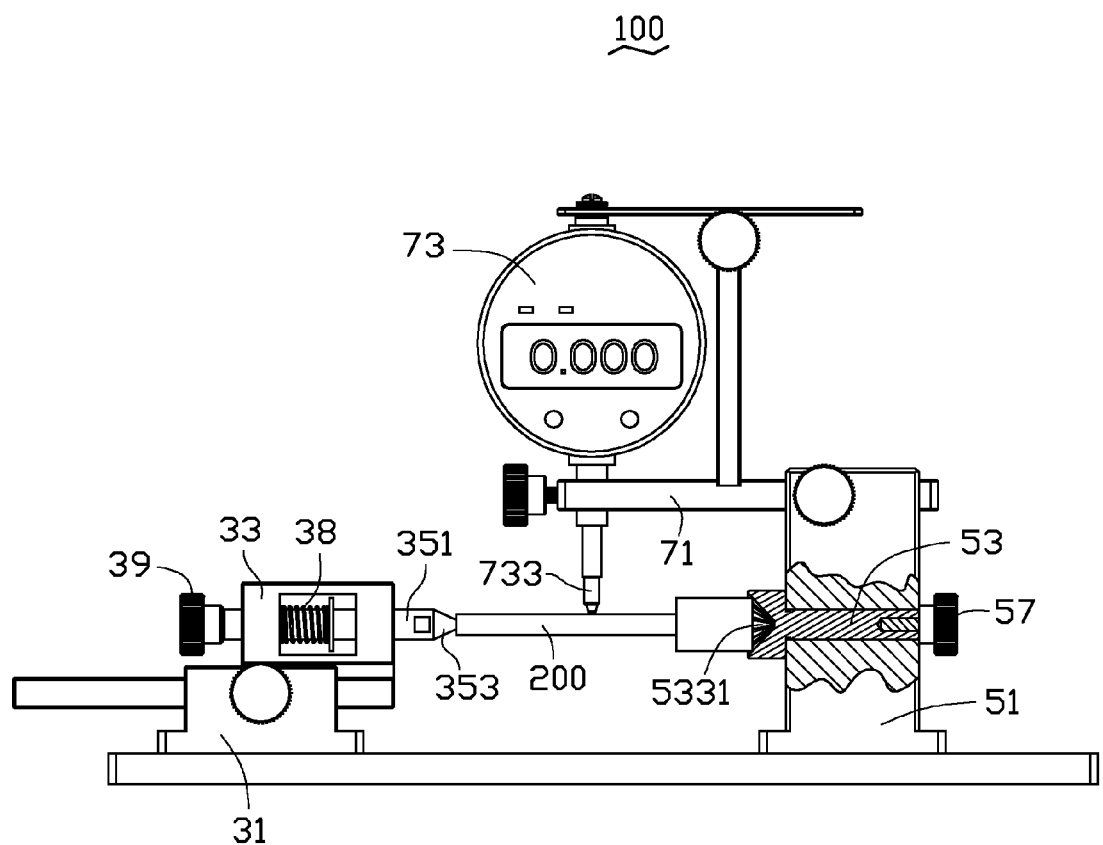
FIG. 3 shows a working state for the testing device of FIG. 1.

Referring to FIG. 3, in use, the article 200 is positioned between the resisting portion 353 and the locating portion 533. The resisting portion 353 resists against an end surface of the first portion 201 away from the locating portion 533. An end of the second portion 203 resists an inner wall of the positioning hole 5331. A position of the gauge 73 is adjusted to make the measuring portion 733 contact a peripheral wall of the first portion 201. A meter of the gauge 73 is set to zero, and the operation member 57 is rotated, thereby rotating the benchmark member 53 and the article 200. The gauge 73 measures a coaxial tolerance of the first portion 201 relative to the axis of the article 200. Positions of the loading member 71 and the measuring assembly 70 are adjusted for testing different positions of the article 200.

As described above, the positioning member 35 is movably positioned on the fixing base 31, and the benchmark member 53 is movably positioned on the mounting base 31. During testing, the article 200 is positioned between the positioning member 35 and the benchmark member 53. The measuring portion 733 contacts the peripheral wall of the article 200, and the benchmark member 53 and the article 200 are rotated to obtain the coaxial tolerance of a test portion of the article 200 relative to the axis of the article 200. Therefore, operation of the testing device 100 is simplified.

In other embodiments, the slider 33, the clip member 37, and the elastic member 38 of the position assembly 30 can be omitted, such that the positioning member 35 is directly fixed on the fixing base 31. The clip member 37 and the elastic member 38 of the position assembly 30 can be omitted, such that the positioning member 35 is directly fixed on the slider 33. The first support member 75, the second support member 77, and the fasteners 79 can be omitted, such that the gauge 73 can be clamped with the loading member 71. The mounting base 51 can be movably assembled with the loading member 71 in other ways on the base 10, such as by a sliding groove defined in the base 10.

In other embodiments, the testing device 100 can be used for testing circularity, cylindricality, or the like.

Figure 4:
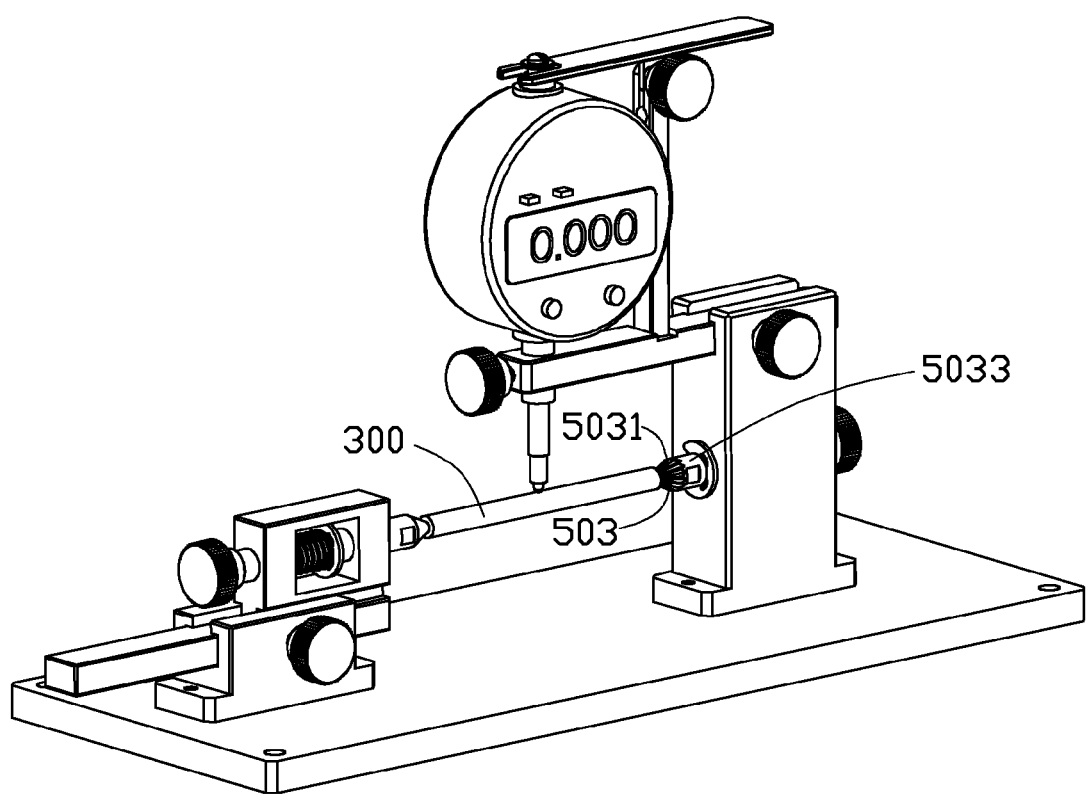
FIG. 4 shows an assembled, isometric of a second embodiment of a testing device.
Figure 5:
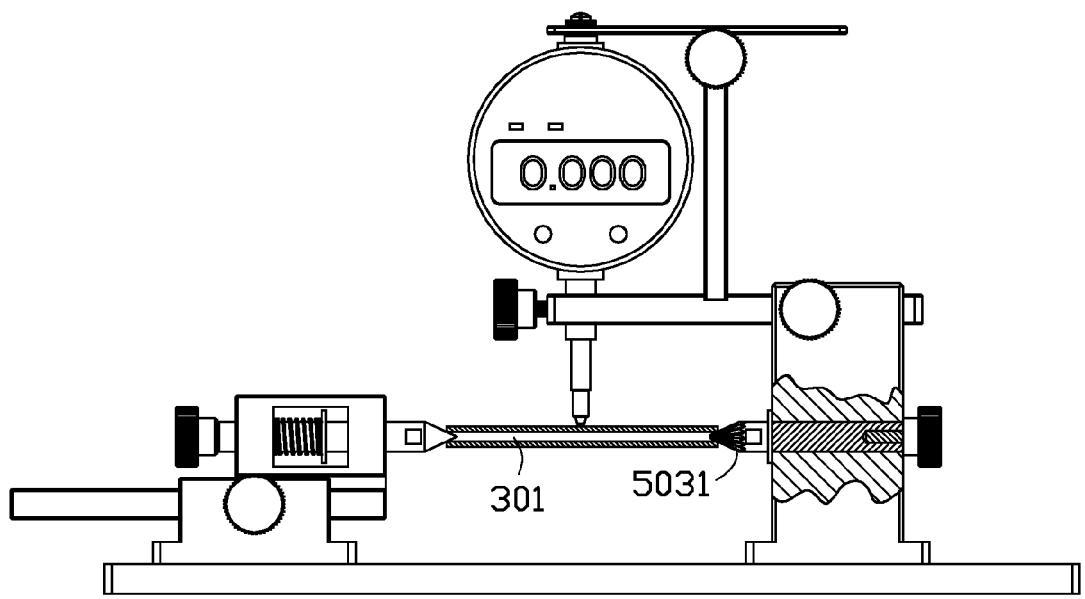
FIG. 5 shows a working state for the testing device of FIG. 4.

FIGS. 4 and 5 show a second embodiment of a testing device 101 for testing whether an axis of a shaft hole 301 of an article 300 is coaxial with an axis of the article 300. A structure of the testing device 101 of the second embodiment is substantially similar to that of the testing device 100 of the first embodiment. The difference is a structure of a benchmark member 503. The benchmark member 503 includes a locating portion 5031 and a rotating portion 5033 coaxially connected with the locating portion 5031. A benchmark line of the benchmark member 503 is coaxial with the article 300. The locating portion 5031 is substantially cone-shaped. A plurality of resisting grooves (not labeled) is defined in the locating portion 5031 for increasing amount of friction between the benchmark member 503 and the article 300 during testing. During testing, the locating portion 5031 extends into the shaft hole 301 and resists against the article 300.

Figure 6:
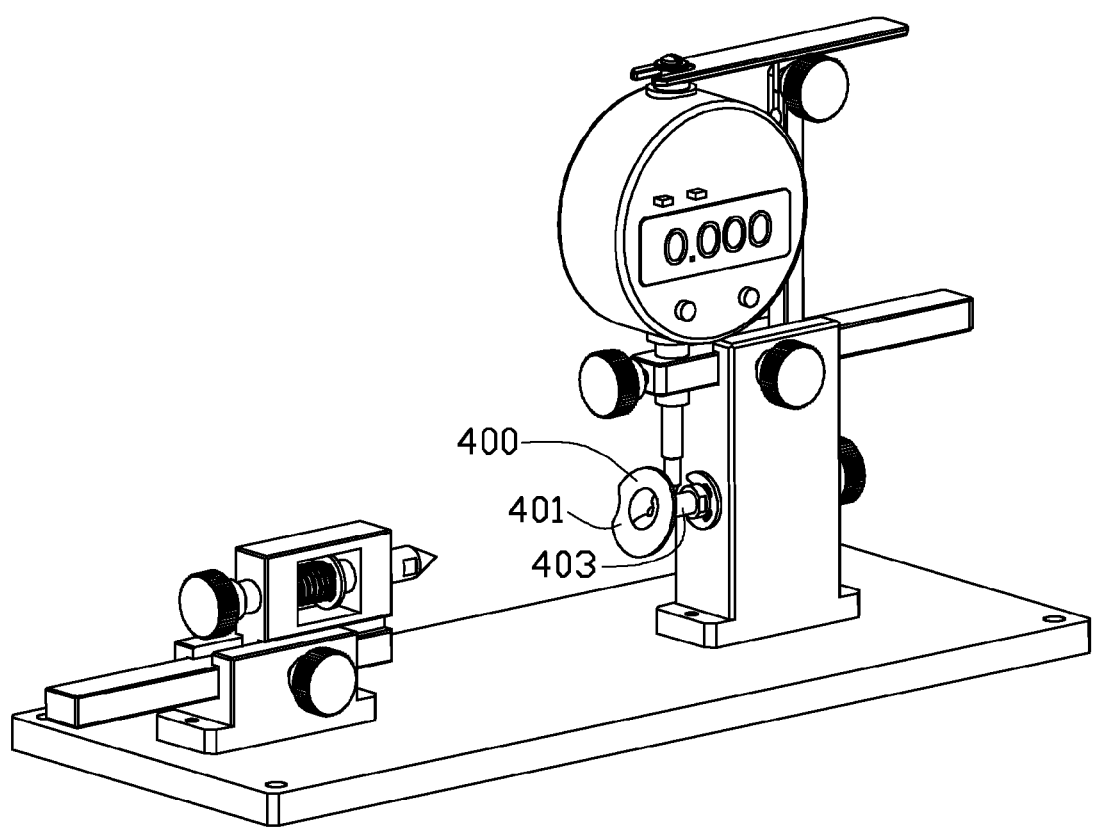
FIG. 6 shows an assembled, isometric of a third embodiment of a testing device.
Figure 7:
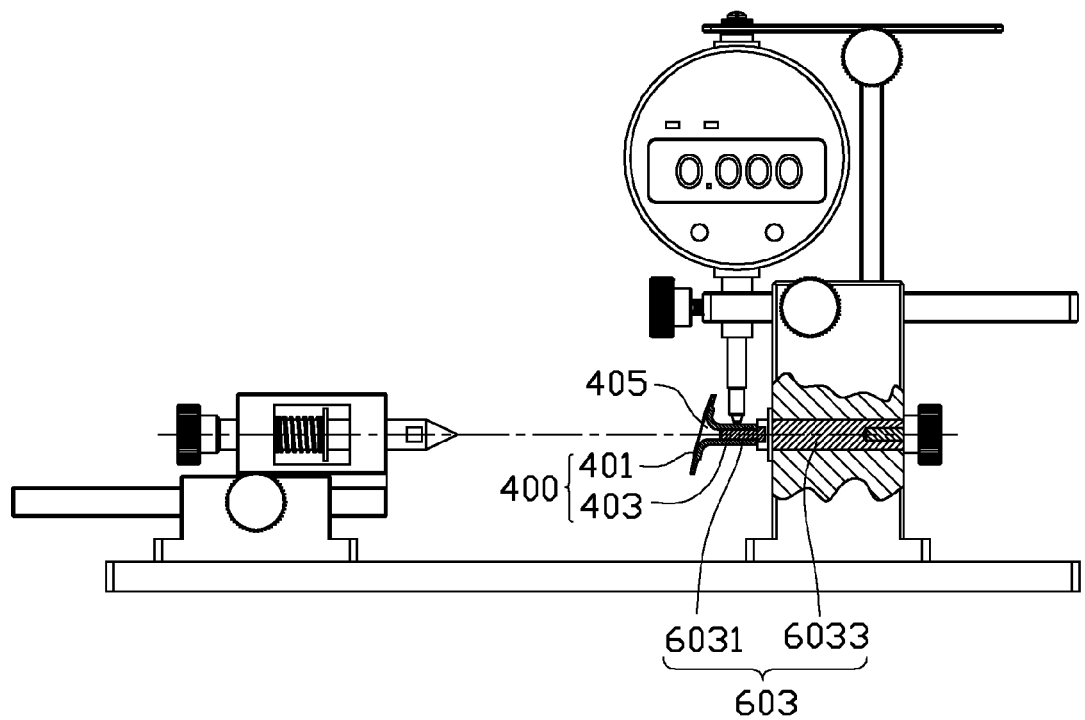
FIG. 7 shows a working state for the testing device of FIG. 6.

FIGS. 6 through 7 show a third embodiment of a testing device 103 for testing whether an axis of an irregularly-shaped first portion 401 of an article 400 is coaxial with an axis of a columnar second portion 403 of the article 400. A shaft hole 405 with inner threads is defined through the first portion 401 and the second portion 403. A structure of the testing device 103 of the third embodiment is substantially similar to that of the testing device 100 of the first embodiment, except for the difference found for a structure of a benchmark member 603. The benchmark member 603 includes a rotating portion 6031 and a locating portion 6033 coaxially connected to the rotating portion 6031. A benchmark line of the benchmark member 603 is coaxial with the article 400. A diameter of the locating portion 6033 is less than that of the rotating portion 6031. Outer threads are formed on an outer surface of the locating portion 6033. In testing, the locating portion 6033 extends into the shaft hole of the first portion 401 to screw into the article 400.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A testing device for testing coaxial tolerance of at least one columnar portion of an article relative to an axis of the article, and the testing device comprising:
a position assembly comprising a fixing base and a position member movably mounted on the fixing base;
a benchmark assembly positioned spacedly from the position assembly, the benchmark assembly comprising a mounting base oppositely configured to the fixing base of the position assembly, and a benchmark member rotatably positioned on the mounting base; and
a measuring assembly positioned on the mounting base,
wherein the benchmark member comprises a rotating portion and a locating portion coaxially connected with the rotating portion, the rotating portion is movably received in the mounting base, the locating portion protrudes from the mounting base towards the position member, the measuring assembly comprises a loading member movably positioned on the mounting base and a gauge, the gauge is mounted on the loading member, the gauge contacts an peripheral wall of the at least one columnar portion of the article to measure coaxial tolerance of the at least one columnar portion relative to the axis of the article when the article is located between the locating portion and the position member, and an axis of the benchmark member is coaxial with an axis of the article.

2. The testing device of claim 1, wherein a positioning hole is defined in an end surface of the locating portion away from the rotating portion for positioning the article between the positioning hole and the position member.

3. The testing device of claim 2, wherein the positioning hole is a substantially funnel-shaped hole, and a hole diameter of the positioning hole increases from the rotating portion to the locating portion.

4. The testing device of claim 2, wherein a plurality of resisting groove is defined around a sidewall of the positioning hole for increasing amount of friction between the benchmark member and the article.

5. The testing device of claim 2, wherein the locating portion has a cone shape, a diameter of the locating portion decreases from a first end of the locating portion adjacent to the rotating portion to a second end of the locating portion away from the rotating portion.

6. The testing device of claim 1, wherein the position assembly further comprises a slider slidably positioned on the fixing base, and the position member is movably mounted on the fixing base via the slider.

7. The testing device of claim 6, wherein the slider comprises a sliding portion, a connection portion, and an installation portion, the sliding portion is slidably received in the fixing base, the connection portion is connected with the sliding portion away from the fixing base and is slidably received in the fixing base, and the installation portion is connected with the connection portion away from the sliding portion.

8. The testing device of claim 7, wherein a receiving hole is defined in a substantially middle portion of the installation portion, two penetrating holes are defined in opposite end surfaces of the installation portion and communicating with the receiving hole, and the position member is received through the penetrating holes and the receiving hole.

9. The testing device of claim 8, wherein the position assembly further comprises a clip member and an elastic member, the clip member sleeves on the position member and received in the receiving hole, and the elastic member is sleeved on the position member and received in the receiving hole, such that the elastic member resists between the clip member and an end wall of the receiving hole adjacent to the benchmark member.

10. The testing device of claim 6, wherein the fixing base comprises a fixing portion and a guiding portion protruding from one side of the fixing portion, and a guide groove is defined in the guiding portion away from the fixing portion, and the slider is slidably received in the guide groove.

11. The testing device of claim 1, wherein the position member comprises a fastening portion and a resisting portion extending from one end of the fastening portion, a diameter of the resisting portion is gradually decreased from a first end of the resisting portion, which is adjacent to the fastening portion, to a second end of the resisting portion facing the benchmark member.

12. The testing device of claim 1, wherein the measuring assembly further comprises a first support member and a second support member, the first support member is fixedly connected with the loading member, and the second support member is connected between the gauge and the first support member.

13. The testing device of claim 12, wherein the second support member comprises a main body and a fixing slice protruding from the main body, the main body is connected with the gauge with one end thereof, and the fixing slice is connected with the first support member.

14. The testing device of claim 13, wherein two clamping arms are separately formed in the end of the main body, a portion of the gauge is clamped between the two clamping arms.

15. The testing device of claim 12, wherein the gauge comprises a gauge body, a measuring portion, and a clamp portion, the measuring portion is positioned on the gauge body, the measuring portion adjustably passes through the loading member for connecting with the article, and the clamp portion is adjustably positioned on the gauge body opposite to the measuring portion and is connected with the second support member.

16. The testing device of claim 1, wherein the mounting base comprises s a holding portion and a location portion protruding from the holding portion, a sliding groove is defined in an end surface of the location portion away from the holding portion, and the loading member is slidably received in the sliding groove.

17. A testing device comprising:
a position assembly comprising a fixing base and a position member movably mounted on the fixing base;
a benchmark assembly spaced from the position assembly, the benchmark assembly comprising a mounting base configured oppositely to the fixing base of the position assembly, and a benchmark member rotatably positioned on the mounting base; and
a measuring assembly positioned on the mounting base,
wherein the benchmark member comprises a rotating portion and a locating portion coaxially connected with the rotating portion, the rotating portion is movably received in the mounting base, the locating portion protrudes from the mounting base and facing the position member, and the measuring assembly comprises a loading member movably positioned on the mounting base and a gauge mounted on the loading member.

18. A testing device for testing coaxial tolerance of at least one columnar portion of an article relative to an axis of the article, the article having a shaft hole forming inner threads, and the testing device comprising:
a benchmark assembly comprising a mounting base and a benchmark member rotatably positioned on the mounting base; and
a measuring assembly positioned on the mounting base spaced from the benchmark member,
wherein the benchmark member comprises a rotating portion and a locating portion coaxially connected with the rotating portion, the rotating portion is movably received through the mounting base for rotating the article, the locating portion protrudes from the mounting base, the measuring assembly comprises a loading member movably positioned on the mounting base and a gauge mounted on the loading member, the gauge contacts with a peripheral wall of the at least one columnar portion of the article to measure the coaxial tolerance of the at least one columnar portion relative to the axis of the article when the locating portion extends into and screwed with the shaft hole, and an axis of the benchmark member is coaxial with an axis of the article.

* * * * *